May 17, 1966 V. R. SAARI 3,252,007

STABILIZED NON-LINEAR FEEDBACK AMPLIFIER

Filed Oct. 3, 1963

INVENTOR
V. R. SAARI
BY Leonard M. Arnold
ATTORNEY

United States Patent Office 3,252,007
Patented May 17, 1966

3,252,007
STABILIZED NON-LINEAR FEEDBACK AMPLIFIER

Veikko R. Saari, Murray Hill, N.J., assignor to Bell Telephone Laboratories, Incorporated, New York, N.Y., a corporation of New York Filed Oct. 3, 1963, Ser. No. 313,650
5 Claims. (Cl. 307—88.5)

Figure 1:
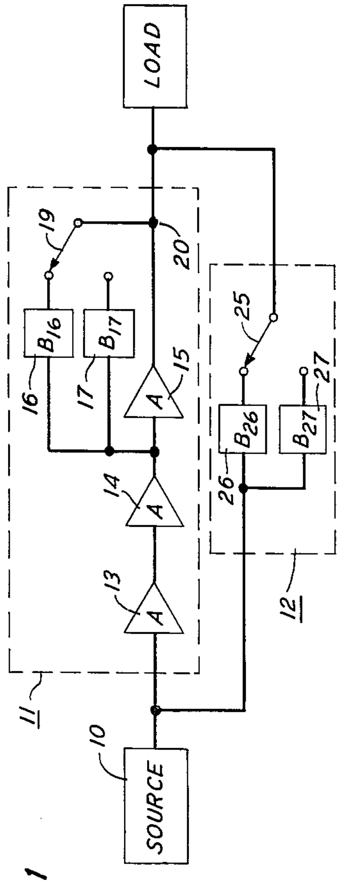

This invention relates to feedback amplifiers and more particularly to feedback amplifiers employing non-linear negative feedback.

Amplifiers providing complex or non-linear input-output characteristics are often required as limiters, volume compressors and the like. By employing negative feedback that varies in magnitude with the signal level it is possible to achieve quite a variety of input-output characteristics, including logarithmic. One limitation in the design of such amplifiers is that the $\mu\beta$ characteristics, which is, of course, dependent on the transfer characteristic of the forward path ($\mu$) and that of the feedback path ($\beta$), must be so designed that the amplifier is stable for all values of $\beta$ which, of course, varies with signal level. Thus, if conditions are adjusted for a maximum bandwidth for the condition of a minimum value of $\beta$, any increase in $\beta$ which may be required at other signal levels may and usually will seriously impair the stability of the amplifier. Accordingly, it has been necessary that the bandwidth and related characteristics be determined by the requirements for stable operation under the signal conditions for which $\beta$ is a maximum.

It is an object of the invention to reduce the limitations on bandwidth and other operating characteristics of amplifiers employing non-linear negative feedback while maintaining the stability of operation of the amplifier.

In accordance with this invention, an amplifier having a non-linear input-output characeristic which is achieved by employing non-linear negative feedback is arranged to have the nominal gain ($\mu$) vary in a fashion complementary to the variation in the feedback fraction ($\beta$) required to produce the non-linear input-output characteristic. Thus the feedback factor ($\mu\beta$) is maintained essentially constant and the requirements for stability of operation are the same for all signal levels. At the same time, by employing a large feedback factor ($\mu\beta$) the resultant overall gain of the amplifier, which is proportional to the reciprocal of $\beta$, can be controlled to provide the required non-linear relationship between signal input and output by causing the feedback fraction ($\beta$) to vary non-linearly with the signal level.

In a particular embodiment of the invention there is employed a multistage amplifier with at least one overall negative feedback network including a biased switching diode which operates to bring the feedback network in and out of operation as the signal level varies. At the same time, the overall nominal gain ($\mu$) is caused to vary to maintain the feedback factor ($\mu\beta$) essentially constant by providing variable internal negative feedback for at least one of the amplifier stages. The internal feedback path is also equipped with at least one switching diode to bring it in and out of operation in essential synchronism with the overall feedback.

Figure 2:
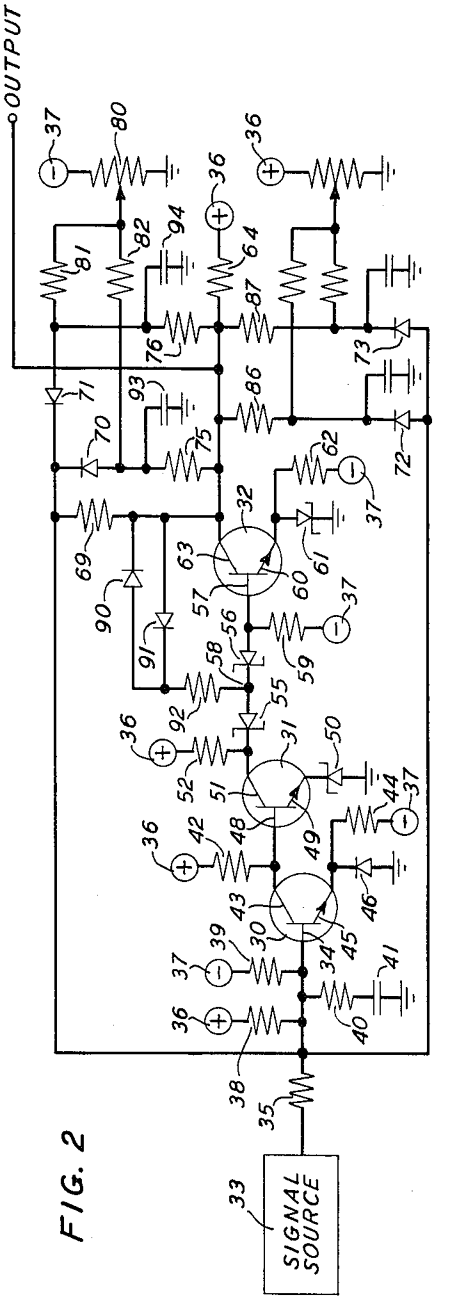

This invention will be more fully comprehended from the following detailed description taken in conjunction with the drawing in which:

FIG. 1 is a block diagram representation of a non-linear negative feedback amplifier embodying the invention; and FIG. 2 is a schematic diagram of a non-linear feedback amplifier embodying the invention which has a logarithmic input-output gain characteristic.

In the circuit of FIG. 1 an input signal from a source 10 is applied to a feedback amplifier. The feedback amplifier comprises an amplifier section 11 having a nominal gain $\mu$, and a $\beta$ feedback network 12. For illustrative purposes the amplifier 11 is shown as comprising three stages of amplifications 13, 14 and 15 with one of the stages 15 having associated with it two local $\beta$ feedback networks 16 and 17. A switch 19 is provided to connect one or the other of the $\beta$ feedback networks 16, 17 between the output terminal 20 of amplifier 15 and its input. For low level output signals below a predetermined value local feedback circuit 16 is connected between the input and output terminals of amplifier 15. As is well known in the art, the nominal gain (i.e., the gain without the feedback network 12) of such a three stage amplifier is $$\mu=\mu_1\mu_2\mu_3\frac{1}{1-\mu_3\beta_1}$$

where $\mu_1$, $\mu_2$ and $\mu_3$ are the nominal gains of amplifiers 13, 14 and 15, respectively, and $\beta_1$ is the fraction of the output signal from amplifier 15 which is fed back to the input of amplifier 15 through feedback circuit 16.

The output terminal 20 of amplifier 11 is also connected to a switch 25 which connects either feedback network 26 or 27 between the output terminal 20 of amplifier 11 and its input terminal to provide overall feedback. At low levels of the output signal at output terminal 20, feedback network 26 is connected by means of switch 25 between the input and output terminals of amplifier 11 to provide overall feedback. In order to obtain an input-output characteristic in which the output increases with input at a lower rate for signals above a predetermined level, the value of the overall feedback fraction $\beta_0$ for such higher level signals may be increased at the predetermined signal level by substituting feedback network 27 for the network 26 between the input and output terminals of amplifier 11. If the amplifier has been designed close to the requirements for stability at the lower value of $\beta_0$ utilized for lower signal levels, the increase in $\beta_0$ by the operation of switch 25 may cause such an increase in $\mu\beta_0$ that the amplifier may well be brought into a condition of instability and oscillation may set in. In order to avoid this instability designers, heretofore, have had to consider all possible values of $\beta_0$ and accept the narrower available bandwidth afforded with the higher value of $\beta_0$.

In accordance with applicant's invention, however, instability is avoided by reducing the $\mu$, or nominal gain, of the amplifier when the overall feedback fraction $\beta_0$ is increased so that the feedback factor $\mu\beta_0$ is substantially constant irrespective of which overall feedback network 26 or 27 is connected. To accomplish this, switch 19, which may be thought of as being synchronized to switch 25, substitutes feedback network 17 for network 16 between the input and output terminals of amplifier 15 to reduce the gain of amplifier 15. The gain of amplifier 15 is $$\frac{\mu_3}{1-\mu_3\beta_1}$$

where $\beta_1$ is the feedback fraction of the local feedback path between the input and output terminals of amplifier 15 and $\mu_3$ is the nominal gain of amplifier 15. The overall nominal gain of the amplifier is $$\mu=\mu_1\mu_2\frac{\mu_3}{1-\mu_3\beta_1}$$

and the feedback factor for the overall loop is:

$$\mu\beta_0=\mu_1\mu_2\frac{\mu_3}{1-\mu_3\beta_1}\beta_0$$

where $\beta_0$ is the feedback fraction of the overall feedback path so that where $\beta_1 >> 1$ $$\mu\beta_0 = -\mu_1\mu_2\frac{\beta_0}{\beta_1}$$

Thus, it may be seen that if the local feedback fraction $\beta_1$ is increased in direct proportion to the increase in the overall feedback fraction $\beta_0$, the feedback factor $\mu\beta_0$ is maintained constant and the stability of the amplifier is maintained. In this way the bandwidth of the amplifier may be maintained at the value at which stable operation is attained for the lower value of the feedback fraction $\beta_0$ even though the feedback is increased at higher signal levels to give the non-linear type of amplification desired.

It should be recognized, of course, that when it is desired that the gain of the feedback amplifier be increased for signals above a predetermined level, the overall feedback fraction $\beta_0$ may be decreased and if it is desirable to maintain the feedback factor constant this can be achieved by increasing the nominal gain $\mu$.

Finally, switches 19 and 25 have been shown in mechanical form in order to simplify the explanation of the circuitry. As is well known in the art, many forms of high speed electronic switches may be employed for this purpose.

An amplifier having a logarithmic input-output characteristic and embodying the principles of this invention is shown in FIG. 2. In order to obtain such an input-output characteristic it is necessary to employ increasing values of the overall feedback fraction $\beta_0$ in order to reduce the gain of the feedback amplifier as the output signal increases in magnitude. With such increasing values of $\beta_0$ the amplifier would normally be unstable unless a relatively narrow band amplifier were designed in accordance with the maximum value of $\beta_0$ to be employed. In accordance with this invention the increases of $\beta_0$ are compensated for by a decrease in the nominal gain $\mu$ of the amplifier so that the feedback factor $\mu\beta_0$ is held relatively constant and stability is maintained. In this particular embodiment of the invention $\mu\beta_0$ is not, as will be seen, held absolutely constant; rather $\mu$ is reduced as $\beta_0$ is increased to hold the product $\mu\beta_0$ within tolerable limits. In other applications, as explained above, $\mu\beta_0$ may be held substantially constant by reducing the value of $\mu$ as $\beta_0$ increases so that $\mu$ and $\beta_0$ are inversely related.

The amplifier shown in FIG. 2 comprises three stages of amplification comprising the transistors 30, 31 and 32 each connected in the common-emitter configuration. The input signal from a source 33 of signals to be amplified is applied to the base electrode 34 of transistor 30 by means of a resistor 35, while the D.-C. potential at the base electrode of the transistor is established by a voltage divider circuit comprising positive voltage source 36, negative voltage source 37 and resistors 38 and 39 which connect sources 36 and 37, respectively, to base electrode 34. The input signal path is completed by means of the serial connection of resistor 40 and capacitor 41 connected between the base electrode 34 and ground potential. The collector emitter bias on the transistor is established by means of a resistor 42 connected between the collector electrode 43 of transistor 30 and source 36 and a resistor 44 connected between the emitter electrode 45 of transistor 30 and negative voltage source 37. A junction diode 46 connected between the emitter electrode 45 of transistor 30 and ground potential provides temperature stability.

The output signal from the first common emitter transistor amplifier 30 is taken from the collector electrode 43 by means of a direct connection to the base electrode 48 of transistor amplifier 31. The emitter electrode 49 of transistor 31 is established at approximately the same potential as the collector electrode 43 of transistor 30 by means of a Zener diode 50 connected between the emitter electrode 49 and ground potential. The collector electrode 51 is biased by source 36 through resistor 52.

The collector electrode 51 of transistor 31 is coupled to the base electrode 57 of the transistor 32 of the third stage of amplification by means of two Zener diodes with the cathode of the first Zener diode 55 connected to the collector electrode 51 of transistor 31 and the anode of the second Zener diode 56 connected to the base electrode 57 of transistor 32. The anode of Zener diode 55 and the cathode of Zener diode 56 are connected together at a common junction point 58 and the voltage at this common junction point is determined by means of the voltage divider comprising voltage source 36, resistor 52, negative voltage source 37, and resistor 59. A Zener diode 61 connected between the emitter electrode 60 and ground potential and a resistor 62 connected between negative voltage source 37, and emitter electrode 60 establish the proper emitter electrode bias. The collector electrode 63 of transistor 32 is biased by means of a connection from positive voltage source 36 through resistor 64.

At low values of output voltage the only feedback in this circuitry is provided by resister 69 connected between the collector electrode 63 of transistor 32 and the base electrode 34 of transistor 30. Two additional pairs of overall feedback paths between the collector electrode 63 of transistor 32 and the base electrode 34 of transistor 30 are provided by two pairs of junction diodes 70–72 and 71–73. The anodes of diodes 70 and 71 are connected to the collector electrode 63 of transistor 32 by resistors 75 and 76, respevtively, so that when predetermined positive output voltage levels are reached the diodes will conduct as determined by the threshold value established at the anode of each diode. A threshold circuit comprising negative voltage source 37, potentiometer 80, and resistors 81 and 82 establishes the positive voltage level at which the respective diodes will conduct. Diode 71 is set to conduct at a first predetermined output voltage while diode 70 is set to conduct at a higher predetermined output voltage. Thus when the output signal level reaches the positive voltage level at which diode 71 will conduct a second feedback path from collector electrode 63 of transistor 32 to base electrode 34 of transistor 30 is established through resistor 76 and diode 71. This feedback path shunts the original feedback path provided by resistor 69 connected between the collector electrode 63 of transistor 32 and the base electrode 34 of transistor 30 and provides additional feedback. When the output signal reaches the level of positive voltage at which diode 70 conducts still another overall feedback circuit is connected in the circuit, $\beta_0$ is increased still more, and the gain is reduced again.

Similar circuitry is provided to insert two additional overall feedback paths when the input signal goes negative. These latter feedback paths comprise diodes 72 and 73 which are connected to collector electrode 63 of transistor 32 by means of resistors 86 and 87. Junction diodes 72 and 73 are biased to conduct at the same magnitude of output level as diodes 70 and 71, respectively, by means of threshold circuitry similar to that used in connection with diodes 70 and 71.

To avoid the problem of instability created by these increases in overall feedback as the output signal becomes greater in magnitude, in accordance with this invention, the nominal gain $\mu$ of the amplifier is reduced at an intermediate value of output voltage magnitude so that the feedback factor $\mu\beta_0$ is kept within a range sufficient to maintain circuit stability and bandwidth. This is accomplished by means of a local feedback path around transistor amplifier 32 so that when the output signal is greater in absolute magnitude than the level at which diodes 71 and 73 conduct either diode 90 or diode 91, depending whether the output signal is positive or negative, will conduct thus connecting the collector electrode 63 of transistor 32 to junction point 58 through resistor 92. This local feedback path around transistor 32 reduces the gain of the third amplifier stage thus reducing the nominal gain $\mu$ of the three stage amplifier. The reduction in the value of $\mu$ compensates for the increasing values of overall feedback so that even when both diodes 70, 71 (or 72, 73) conduct the value of the feedback factor $\mu\beta_0$ is sufficiently reduced so that the amplifier is not rendered unstable. Thus in the embodiment of the invention shown in FIG. 2 the value $\mu$ does not precisely inversely follow the value of $\beta_0$ feedback, but rather is reduced so that the product $\mu\beta$, that is the feedback factor, is held to a value at which the amplifier is stable. It should be recognized, of course, that the embodiment of the invention shown in FIG. 2 is merely an example of the application of the principles of the invention and that $\mu$ could be made to follow $\beta_0$ in an inverse manner so that the feedback factor would be maintained substantially constant.

To obtain a logarithmic input-output gain characteristic the following components and component values may be employed in the circuit of FIG. 2. With these components and component values the direct current level of the base electrode 34 of transistor 30 is zero volt and the junction 58 is also at zero direct current level. The diodes 71 and 73 conduct at +1 volt and —1 volt, respectively, and the diodes 70 and 72 conduct at +2 volts and —2 volts, respectively. Diodes 91 and 90 conduct at +1.5 volts and —1.5 volts, respectively.

| | | |
|---|---|---|
| Transistors **30, 31, 32** | | 2N1051 |
| Diode **46** | | 1N697 |
| Diode **50** | v. Zener | 6 |
| Diode **55** | v. Zener | 15 |
| Diode **56** | v. Zener | 8 |
| Diode **61** | v. Zener | 9 |
| Diode **70** | | 1N696 |
| Diode **71** | | 1N696 |
| Diode **72** | | 1N696 |
| Diode **73** | | 1N696 |
| Diode **90** | | 1N696 |
| Diode **91** | | 1N696 |
| Resistor **35** | | 30K |
| Resistor **38** | | 240K |
| Resistor **39** | | 120K |
| Resistor **40** | | 560 |
| Resistor **42** | | 430K |
| Resistor **44** | | 10K |
| Resistor **52** | | 6.8K |
| Resistor **59** | | 8.2K |
| Resistor **62** | | 360 |
| Resistor **64** | | 2.4K |
| Resistor **69** | | 100K |
| Resistor **75** | | 300K |
| Resistor **76** | | 2.7K |
| Resistor **81** | | 12.7K |
| Resistor **82** | Meg | 7.3 |
| Resistor **86** | | 300K |
| Resistor **87** | | 2.7K |
| Resistor **92** | | 390 |
| Capacitor **41** | $\mu$f | .005 |
| Capacitor **93** | pf | 10 |
| Capacitor **94** | pf | 680 |
| Voltage source **36** | v | +48 |
| Voltage source **37** | v | —24 |

It is to be understood that the above-described arrangements are illustrative of the application of the principles of the invention. Numerous other arrangements may be devised by those skilled in the art without departing from the spirit and scope of the invention.

What is claimed is:

1. An amplifier for producing signal outputs nonlinearly related to the signal input comprising an amplifier having a nominal gain $\mu$, a non-linear negative feedback network connected between the output and input of said amplifier for feeding back to the input a fraction $\beta$ of the output signal, said fraction $\beta$ varying with the signal level, and means for varying the nominal gain $\mu$ in response to variations in signal level in inverse proportion to the variations in $\beta$.

2. An amplifier for producing signal outputs non-linearly related to the signal input comprising an amplifier having a nominal gain $\mu$, a non-linear negative feedback network connected between the output and input of said amplifier for feeding back to the input a fraction $\beta$ of the output signal, said fraction $\beta$ increasing for predetermined higher output level signals, and means to reduce the nominal gain $\mu$ in response to said predetermined higher output level signals so that $\mu$ and $\beta$ are inversely related.

3. An amplifier for producing signal outputs non-linearly related to the signal input comprising an amplifier having a nominal gain $\mu$, an input and an output, and at least two stages of amplification, one of the stages of amplification having a local non-linear negative feedback network connected between the output and input of the stage for feeding back to the input of the stage a fraction $\beta_1$ of the output signal from the stage, a non-linear negative feedback network connected between the output and input of said amplifier for feeding back to the input a fraction $\beta_0$ of the output signal, said fraction $\beta_0$ increasing in response to predetermined higher levels of the output signal to reduce the overall gain of said amplifier circuit, and means to increase the feedback fraction $\beta_1$ of said local feedback path in response to said predetermined higher levels of the output signal to reduce the gain of the stage of amplification having local feedback to reduce the nominal gain $\mu$ of said amplifier so that the feedback factor $\mu\beta_0$ is maintained substantially constant.

4. An amplifier circuit having a non-linear input-output characteristic comprising an amplifier having an input terminal, an output terminal, and at least two stages of amplification of nominal gain $\mu$, one of said stages having a non-linear local feedback network connected between its input and output for feeding back a fraction $\beta_1$ of the output signal from the output of said stage to its input, said feedback fraction $\beta_1$ being zero below a predetermined magnitude of the output signal from said stage of amplification, a non-linear overall feedback network connected between said input and output terminals of said amplifier for feeding back to the input a fraction $\beta_0$ of the output signal which fraction increases in discrete steps when the output signal exceeds predetermined levels, and means to increase the feedback fraction $\beta_1$ of said local feedback path at a level of the output signal intermediate said predetermined levels at which the feedback fraction $\beta_0$ of the overall feedback path is increased.

5. An amplifier circuit having a non-linear input-output characteristic comprising an amplifier having an input terminal, an output terminal, and at least two stages of amplification having a nominal gain $\mu$, an overall feedback network connected between said input and output terminals of said amplifier comprising a resistor connected to feed back a predetermined fraction of the output signal, a second overall feedback network connected between said input and output terminals comprising a first pair of biased switching diodes each of which conducts at a first predetermined level of the output signal to increase the feedback fraction of the output signal fed back to the input of the amplifier a first of said first pair of diodes conducting when the output signal is of positive polarity and a second conducting when the output signal is of negative polarity, a third overall feedback network connected between said input and output terminals comprising a second pair of biased switching diodes each of which conducts at a second predetermined level of the output signal higher than said first predetermined level to increase the feedback fraction of the output signal fed back to the input of the amplifier, a first of said second pair of diodes conducting when the output signal is of positive polarity and a second conducting when the output signal is of negative polarity, and a local feedback network comprising a pair of biased switching diodes each of which conducts at a third predetermined level of the output signal intermediate said first and second predetermined levels to feed back a fraction of the output signal to the input of the last stage of amplification, a first of said diodes conducting when the output signal is of positive polarity and a second conducting when the output signal is of negative polarity.

References Cited by the Examiner

UNITED STATES PATENTS

| | | | |
|---|---|---|---|
| 2,210,503 | 8/1940 | Shaw | 330—99 X |
| 2,811,591 | 10/1957 | Kennedy | 330—103 X |
| 2,909,620 | 10/1959 | Graef | 330—103 X |
| 3,092,729 | 6/1963 | Gray | 330—28 X |
| 3,124,759 | 3/1964 | Dahlberg | 330—28 X |

FOREIGN PATENTS

| | | |
|---|---|---|
| 261,000 | 9/1949 | Switzerland. |

ARTHUR GAUSS, *Primary Examiner.*

M. LEE, *Assistant Examiner.*